A. ROSENTHAL.
VEHICLE SPRING.
APPLICATION FILED AUG. 30, 1915.
Patented May 2, 1916.
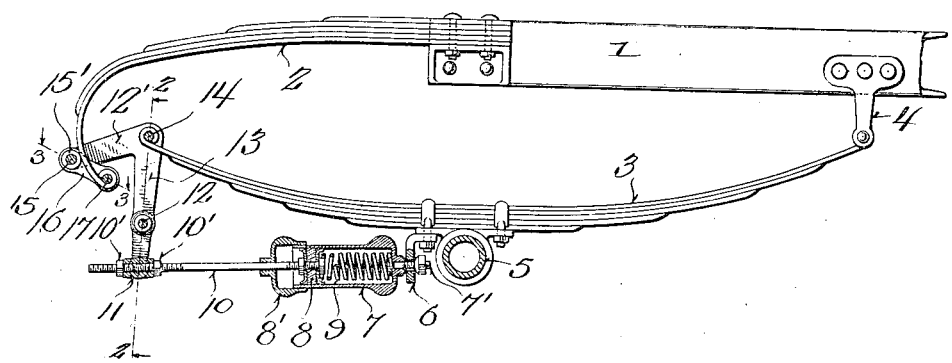
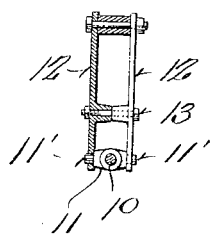
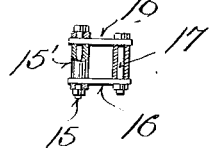

UNITED STATES PATENT OFFICE.

AUGUST ROSENTHAL, OF WEST ALLIS, WISCONSIN.

VEHICLE-SPRING.

1,181,546.  Specification of Letters Patent.  Patented May 2, 1916.

Application filed August 30, 1915. Serial No. 47,911.

*To all whom it may concern:*

Be it known that I, AUGUST ROSENTHAL, a citizen of the United States, and resident of West Allis, in the county of Milwaukee and State of Wisconsin, have invented certain new and useful Improvements in Vehicle-Springs; and I do hereby declare that the following is a full, clear, and exact description thereof.

My invention refers to vehicle springs, and it has for its primary object to provide a simple, economical and effective shock absorbing mechanism so arranged and constructed that a shock upon the spring members is resisted in both directions, and said mechanism is adjustable, whereby the spring tension may be regulated for heavy or light loads, resulting in an easy riding vehicle irrespective of rough road conditions.

The invention contemplates the employment of a toggle lever mechanism between the floating axle and a leaf spring member. Thus the lever mechanism will operate through upward movement of the axle, to exert an auxiliary tension upon both of the springs, and said mechanism will also act to resist the recoil shock.

The invention further contemplates an arrangement for attaching the device to an upper and lower spring member in connection with the vehicle truck frame and axle, wherein said device will tend to exert a downward draw upon the upper spring member, coincident to a compression of the lower spring member, which compression is imparted thereto by upward movement of the axle.

Another object of my invention is to provide a dash-pot mechanism including a piston, which mechanism has one end anchored to the floating axle or spring and the opposite end connected to a bell crank lever that is fulcrumed to the spring member and the bell crank has an arm connected to the frame through some means.

With the above objects in view, the invention consists in what is herein shown, described, and claimed.

In the drawings: Figure 1 represents a side elevation of a portion of a truck frame and spring members, having attached thereto a shock absorbing mechanism embodying the features of my invention, with parts broken away, and parts in section to more clearly show certain details of construction. Fig. 2, a detail sectional view of the shock absorbing mechanism, the section being indicated by line 2—2 of Fig. 1, and Fig. 3, another detail cross section of the device, said section being indicated by line 3—3, of Fig. 1.

Referring by characters to the drawings: 1 represents a beam constituting a part of a vehicle truck frame, and 2, an upper leaf spring member rigidly secured to the beam and projecting beyond its end.

3 indicates a lower leaf spring member of the elliptical type, having one end secured to the beam by a bracket 4, whereby said end is fixed. The lower spring member carries the usual axle 5, that is clipped to said spring member in any suitable manner. One of the clip bolts also confines an apertured ear 6, to which is anchored a dash-pot cylinder 7, by means of a bolt 7', which bolt extends through the ear aperture, and is confined to the said ear by a nut that is slightly crowned, to permit oscillatory movement of the cylinder.

The cylinder has mounted therein, a piston head 8 that is provided with suitable packing gaskets on its faces which engage the cylinders, and interposed between the inner face of the piston head, and the bottom of the cylinder 7, is a coil spring 9, the ends of which are suitably centered about the head of the bolt 7' and the head of a plunger rod 10, which plunger rod passes through and is rigidly affixed to the piston head 8. The plunger rod projects through an aperture in the cap portion 8' of the cylinder and the outer end of said plunger rod passes through an aperture in an oscillatory yoke 11. Arms 11' of the yoke are mounted in suitable apertures that are formed in the lower ends of arms 12—12 of a bell crank lever. The lever arms 12, are secured together by a clamping bolt 13 which passes through bored bosses that extend toward each other, and are in abutted engagement, to thus constitute spacing thimbles. Short arms 12' of the bell crank lever are fulcrumed to the ends of a bolt 14, which bolt is carried by the floating end of the lower spring member 3. The short arms 12' of the bell crank lever are pivotally connected to the projecting ends of a bolt 15, which bolt is carried by a pair of links 16 that are hingedly connected to the end of the spring member 2 by a bolt 17. The ends of the links 16 which engage the bolt 15, are spaced apart by a thimble 15' which thimble rests upon the outer face of the long leaf of the spring member 2.

The means of attaching the bell crank lever to the ends of the upper and lower spring members 2—3, respectively, is particularly designed for use in connection with a spring of standard type, such as shown, the said fitting being adapted to the spring members without changing their relative positions. Thus, under ordinary conditions, the spring members 2 and 3 would be connected at their ends by the links 16, and in order to affix my shock absorbing mechanism, it is only necessary to disconnect the links 16 from the bolt 14, and swing the links to the position shown in Fig. 1, in which position the spacing thimble 15' is adjusted and confined by the bolt 15 that serves as a hinge connection for the ends of the short arm 12' of the said bell crank.

It should be understood that when the links 16 are in the position shown, there is no movement imparted thereto by the action of my device, and said links are simply utilized as a convenient means of attaching the bell crank to the upper spring member.

Should the upper spring member 2 be specially designed for attaching my device, thereto, its end which is shown affixed to the bolt 17, would be dispensed with, and said spring end would then be simply wrapped about the bolt 15.

The long arm of the bell crank lever as shown, carries the yoke 11 and the plunger rod 10 which extends through the yoke aperture is capable of adjustment back and forth with relation to said yoke, and after such adjustment the rod is confined by the clamping nuts 10', which are in threaded union with the plunger rod. This adjustment between the plunger rod and long arms of the bell crank is for the purpose of pre-determinately regulating the resisting force of the spring members 2 and 3. For example, if the vehicle is to be utilized in carrying its maximum load, the clamping nuts 10' would be adjusted in such position as to cause the lever arms 12 to move outwardly toward the end of the plunger rod, and if the minimum load conditions were to be considered, the lever arms would be adjusted in the opposite direction, or toward the dash-pot, whereby the tension of the spring members would be comparatively delicate. Hence, by this adjustment, a vehicle will travel either under light or heavy load conditions, and ride with uniform ease, and also, this adjustment will materially add to the life of the springs, as they will compensate more readily, and respond gently to shock in both directions.

Having described the device in detail, it will be apparent that if the axle should under sudden shock, tend to rise, the force will cause the bell crank connected end of the lower spring 3 to move outwardly, as said spring flattens. This force will be resisted by the short arms of the lever, which are connected to the end of the upper spring member 2, and coincident to this movement, the long arms 12 of the bell crank lever will move toward the dash-pot, and through their plunger rod connection, compress the spring 9, which spring offers an auxiliary force to oppose flattening of the spring 3. This peculiar toggle movement that is imparted to the bell crank lever, will also cause the upper spring member 2, to draw downwardly, as the short arms 12' of said lever assume a different angle, to shorten the distance between the ends of the upper and lower springs. Thus the body of the moving vehicle is caused to travel upon an approximate uniform plane. Hence, the force of the upward blow will be distributed approximately in equal proportions to both spring elements, while under ordinary conditions, the upper spring element would, in place of drawing downwardly, tend to spring upwardly, as the lower spring exerted its upward force. By dividing the strain upon the springs as they are acted upon, under the influence of my shock absorber, it will be observed that an upward shock will tend to draw the body of the vehicle downward, and thus ease the shock of the blow upon the truck. Upon the recovery movement of the floating axle 5, the back lash due to the upward movement thereof, will be relieved and effectually absorbed by the air cushion which is developed at the cap end of the cylinder, and it is also obvious that an air cushion will result when the piston 9 compresses the spring, to thus assist said spring in opposing the upward shock previously described.

While I have shown and described the truck frame, as being provided with a spring member 2, it is obvious that in some instances, for this spring member, I may substitute a rigid member which may be a part of the beam or truck frame, without departing from the spirit of my invention. It will also be apparent that I may apply my bell crank mechanism which is associated with the dash-pot, to the various types of springs and axles now in use.

I claim:

In a structure of the class described the combination with a body frame of a pair of upper and lower spring members having adjacent ends secured to the frame, the other end of the upper member being directed outwardly of the adjacent end of the lower member and extending below said end of an angular lever pivoted at its angle to the lower spring member, one arm of the lever being normally disposed substantially vertically and resiliently yieldably connected with the axle and the free end of the other arm being pivoted to the upper spring member, and disposed at an acute angle to the first arm.

In testimony that I claim the foregoing I have hereunto set my hand at Milwaukee, in the county of Milwaukee, and State of Wisconsin, in the presence of a witness.

AUGUST ROSENTHAL.

Witness:
M. E. DOWNEY.